Nov. 8, 1960 J. R. PIERCE 2,959,639

TRANSMISSION AT REDUCED BANDWIDTH

Filed March 5, 1956 3 Sheets-Sheet 1

INVENTOR
J. R. PIERCE
BY W. L. Keefauver
ATTORNEY

Nov. 8, 1960 J. R. PIERCE 2,959,639

TRANSMISSION AT REDUCED BANDWIDTH

Filed March 5, 1956 3 Sheets-Sheet 2

INVENTOR
J. R. PIERCE
BY W. L. Keefauver
ATTORNEY

INVENTOR
J. R. PIERCE
BY W. L. Keefauver
ATTORNEY

United States Patent Office 2,959,639

Patented Nov. 8, 1960

2,959,639

TRANSMISSION AT REDUCED BANDWITH

John R. Pierce, Berkeley Heights, N.J., assignor to Bell Telephone Laboratories, Incorporated, New York, N.Y., a corporation of New York Filed Mar. 5, 1956, Ser. No. 569,625

9 Claims. (Cl. 178—43.5)

This invention relates to broad band transmission systems and, more particularly, to the conservation of bandwidth in such systems. This application is a continuation-in-part of application Serial No. 171,010, filed June 29, 1950, now abandoned.

Correlations of one sort or another exist in substantially all communication signals. Briefly, correlation is that relation which an elemental part of a signal has with past elements of the signal. A highly correlated message signal effectively loads the transmission medium with excess information not necessary for the reproduction of the signals at the receiving end of the system. However, typical present day communication systems employ sufficient channel capacity to transmit completely random, uncorrelated signals. Manifiestly, considerable increases in transmission efficiency are possible by taking advantage of one or more of these correlations, which may be semantic, spatial, chronological, et cetera in order to reduce signal redundancy.

As an excellent illustration, television signals are generally highly correlated inasmuch as signal representations of large masses and repeated patterns of objects within a picture scene are repeated in successive frame signals. Not only is there considerable chronological correlation from frame to frame, but there is important geometric correlation from line to line. Furthermore, in many television image pictures, there are long stretches of uniform or slowly changing amplitude, so that there is a substantial amount of spatial correlation on individual scanning lines as well. In the televising of certain scenes, such as, for example, a row of people behind a table, the background detail can be suppressed without a serious degradation of picture quality. That is, the uniform or slowly changing stretches of the scene can be skimmed over, using very little channel capacity, while more channel capacity is employed to transmit information depicting faces, hands, and bodies. Thus, by utilizing the high geometric correlation of a particular scene picture redundancy can be moved and the channel capacity required for transmission can be reduced.

The system to be described should be distinguished from systems of the prior art which have attempted to use the process of quantization in effecting a reduction in bandwidth. In quantized systems, a continuous range of signal amplitudes is translated into a waveform having only a finite number of discrete amplitude levels by periodically determining the discrete level into which the instantaneous signal then falls. The quantized signal is therefore a staircase approximation of the signal itself. Since the sampling rate, i.e., the rate at which the signal level must be determined, is necessarily high to permit satisfactory reproduction of the signal from the quantized wave, such systems usually result in an increase in bandwidth requirements rather than a decrease even though a significant improvement in signal-to-noise ratio may result. Systems employing the present invention, on the other hand, by reducing signal redundancy, permit a decrease in bandwidth requirements.

It is therefore a principal object of the present invention to effect a reduction in the bandwidth of a communication signal without seriously degrading the signal.

In accordance with the invention, bandwidth is conserved by taking advantage of certain correlations in the signal. In the specific embodiment described below for purposes of illustration, this is accomplished, in effect, by dividing a signal wave into a continuous succession of independent wave segments of varying lengths and transmitting, at a uniform rate, signals representative of the amplitude and instants of occurrence of the terminal ends of the wave segments. One helpful way of visualizing this basic concept is to consider that the signal envelope is fitted with a series of connecting "chords" or line segments of varying slope and length which approximate the signal to be transmitted. The parameters of the chords, namely their length T and height H, are converted into electrical signals which are, as a rule, irregularly spaced in time. These signals are subsequently transformed into a series of uniformly spaced code pulses for transmission. Bandwidth conservation is achieved by virtue of the fact that slowly varying segments of the signal, for example, the background and table in the picture specifically mentioned above, can be fitted with relatively long chords. The transformation of the randomly spaced signals defining the various line segments therefore permits, in effect, an expansion of the time interval during which shorter segments representing higher frequency content would otherwise have to be transmitted by utilizing the time interval made available by a compression of the longer chords.

The transmitter in the illustrative embodiment described below therefore includes a computing circuit which performs the line or chord fitting operation described above, and produces a series of irregularly spaced code groups of pulses representative of the parameters of successive chords. It also includes, means for transforming these irregularly spaced groups into regularly spaced groups of pulses for transmission. At the receiver, the original signal is recovered from the transmitted information by transforming the regularly spaced code groups back into the irregularly spaced groups representative of the parameters of the irregular chords. From this information there is produced a representation of the original signal made up of a series of straight lines.

The invention will be more fully understood from the following drawings and the accompanying descriptions in which.

Figure 1:
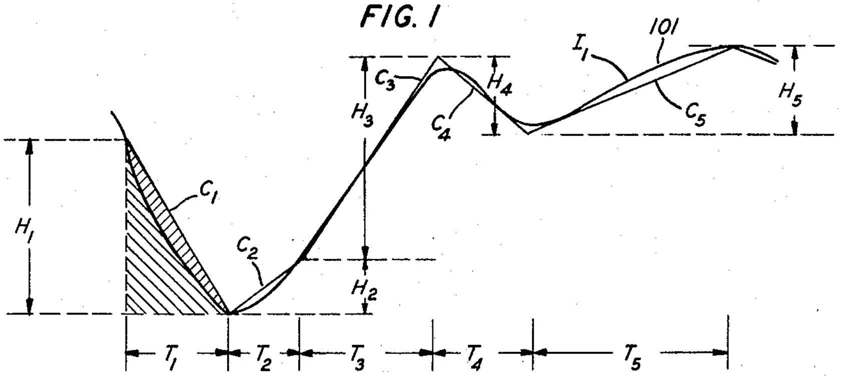
Fig. 1 shows a pictorial representation of the chord fitting operation of the invention.

Fig. 1 illustrates the chord fitting operation whereby a straight line approximation of the message signal is obtained. Solid line 101 illustrates a signal wave and the straight line segments $C_1$, $C_2$, $C_3$, et cetera, are chords associated with discrete segments of the signal. These chords are defined for purposes of transmission by two parameters, their lengths such as $T_1$, $T_2$, et cetera, and their heights $H_1$, $H_2$, et cetera. $T_1$, $T_2$, et cetera, in fact, represent the time intervals spanned by their respective chords, while $H_1$, $H_2$, et cetera, each represent the difference in signal amplitude, in terms of voltage, between the end points of a chord. By an adjustment to be described hereinafter, the number of straight line segments per unit of time used in approximating the message wave may be changed in order to alter the closeness of the fit.

It must be noted that not all line segments start and finish on the input waveform. This comes about because of quantization incorporated in the chord fitting operation, and which will be understood more clearly from the detailed description which follows. For ease of explanation, the system will be described in television terms although it is to be understood that the invention is not limited to television signals.

Figure 2:
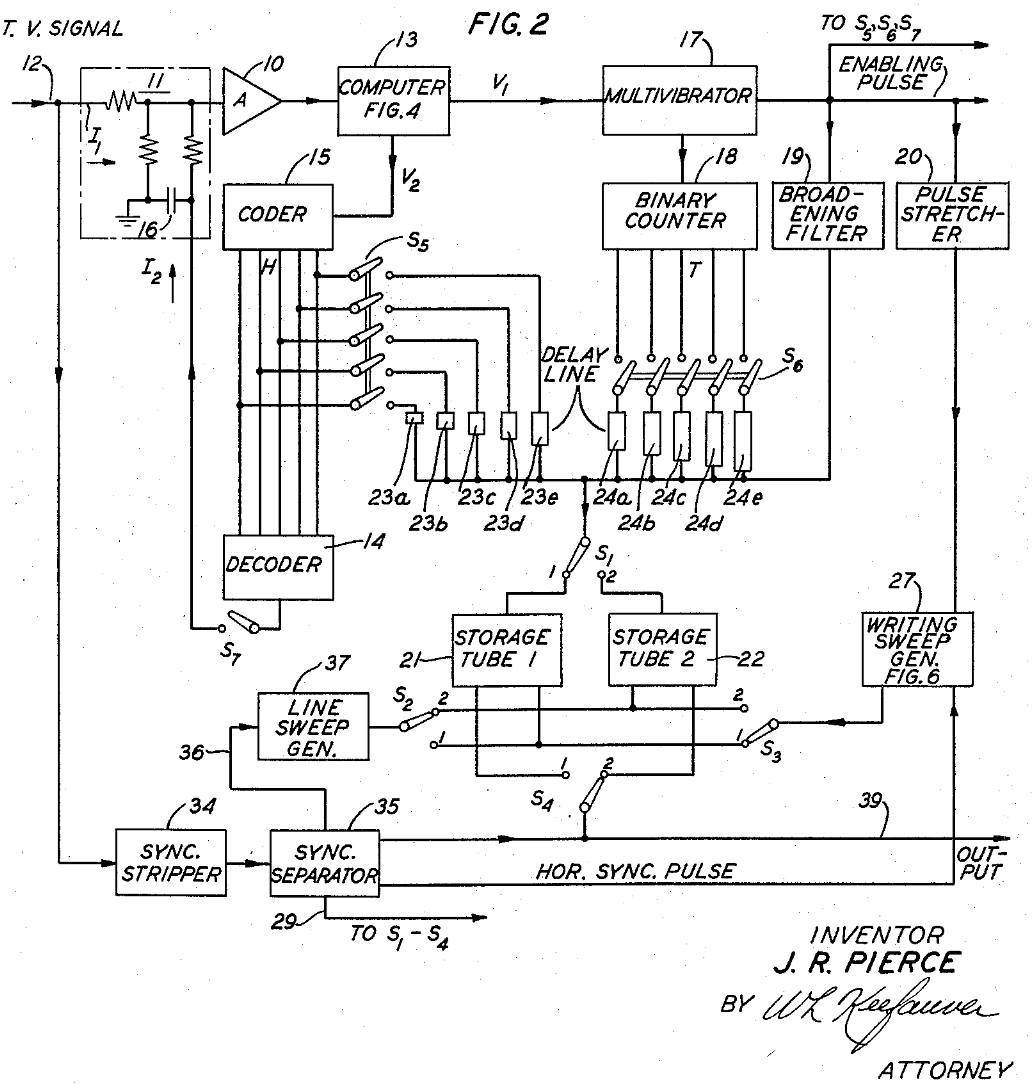
Fig. 2 is a circuit diagram, partially schematic, of a television transmitter which operates in accordance with the invention.

Fig. 2 illustrates a transmitter which may be employed in the practice of the invention. Its overall operation will first be described briefly. A television signal $I_1$ is applied by lead 12, resistive pad 11, and amplifier 10 to computer 13 wherein the message wave is divided into a continuous succession of irregularly spaced segments, or in the language of the aforementioned example, is fitted with a series of connected chords. The computer output signal $V_1$ is supplied by way of multivibrator 17 to binary counter 18 which produces an irregularly spaced series of pulses representative of chord lengths T. Similarly, computer output signal $V_2$, indicative of chord amplitudes H, is encoded in coder 15 to form an irregularly spaced series of code group pulses. The code group pulses produced by binary counter 18 and coder 15 are arranged in sequential order in delay lines 24 and 23, respectively, and stored as regularly spaced code groups alternately on one of the storage tubes 21 or 22. After a complete line of information has been stored, operation of a series of switches permits the information to be removed from the storage tube at a uniform rate and utilized as an output signal on lead 39 while a new line of information is being stored on the other storage tube. The additional elements, depicted in block diagram form, for the most part comprise elements well known in the art and will be described in the detailed operation of the transmitter which follows.

As mentioned above, a televsion signal $I_1$ is applied by lead 12 to the input of amplifier 10 by way of the resistive pad 11. By means of this pad, a second waveform $I_2$ is combined with $I_1$ at the input of amplifier 10. $I_2$, in fact, is the signal amplitude at the end of the next previous fitting operation and is combined in a subtractive manner with $I_1$. The input to amplifier 10 therefore is $I_1-I_2$.

The output of amplifier 10 is applied to a computer 13 which compares the quantity $$\frac{1}{T}\int(I_2-I_1)dt \tag{1}$$

with the quantity $$\frac{1}{2}(I_2-I_1) \tag{2}$$

The first of these quantities is the area between the curve of $I_1$ and the level $I_2$. The second quantity is the area between the level $I_2$ and the chord drawn between the point on the curve of $I_1$ corresponding to the start and the end of the waiting interval divided by the elapsed time T. When the absolute value of the difference becomes greater than some fixed quantity determined by the closeness of the fit desired, the computer produces two output signals, $V_1$ and $V_2$. The output voltage $V_1$ is a measure of the time length of the straight line segment representing the fitted signal, i.e., an indication of the duration of the fitting period, and the output $V_2$ is proportional to the amplitude of the signal at the end of the fitting period T, and hence represents the quantity H.

The output $V_1$ is applied to a monostable multivibrator 17 which produces a timing or enabling pulse which occurs at the end of each fitting interval and which controls the various switches to be described. Each enabling pulse from multivibrator 17 is also employed to reset and start a binary counter 18 which measures, in binary code, the horizontal length or time duration of each line segment. Just before the counter is reset, its count is read out in parallel by switches $S_6$ which are closed at the end of each fitting period by the enabling pulse. The staggered delay lines 24*a* through 24*e* translate the parallel binary pulses as read out of the counter into sequential pulses suitable for storage as the coded T output.

The other output $V_2$ is supplied to a coder 15 which, together with its associated decoder 14, may, for example, be of the kind described in an article in the Bell System Technical Journal, January 1948, pages 1 through 43, entitled "An Experimental Multichannel Pulse Code Modulation System of Toll Quality." Here, successive digits are derived which are representative of the quantity $I_1-I_2$ and which form the coded H output. The enabling pulse occurring at the end of each fitting period closes switch $S_5$ and the digits are applied to delay lines 23*a* through 23*e* of different lengths so as to form a series of digit pulses, spaced in time, suitable for storage as the coded H output.

Additionally, the output of the coder 15 is applied to the decoder 14 and the decoder signal is applied to storage condenser 16 at the end of each fitting by way of the electronic switch $S_7$ which is operated by the enabling pulse. As heretofore described, by action of the network 11 in the input of isolation amplifier 10, there is applied as an input to the amplifier the difference between the instantaneous input television signal $I_1$ and the amplitude at the end of the immediately preceding fitting, $I_2$, which has been stored in the capacitor 16.

The series of delay lines, 23 and 24, are chosen of such lengths that the series of pulses representing the coded H output either regularly follows or precedes the series describing the coded T output. Here, by way of example, it is being assumed that the choice is to have the H code group precede the T code group. Moreover, in order to facilitate synchronization at the receiver of successive line fitting signals, it is desirable, although not necessary, to precede each line fitting signal with an identifying pulse. Any convenient form of identifying pulse well known to those skilled in the art may be used for this purpose, e.g., a burst of frequencies, or a relatively wide pulse, et cetera. To provide such an identifying pulse for each line fitting signal, by way of example, the enabling pulse output of multivibrator 17 may be passed through a broadening filter 19 and the output therefrom added to the corresponding T and H code group output to signal their approach and to allow for separation in the receiver. In this way, there is derived, in succession, an identifying pulse, an H code pulse group and a T code pulse group which form one complete line fitting signal.

In accordance with principles of the invention, successive line fitting signals are stored compactly in the storage tubes 21 and 22 in order to effect a saving in bandwidth. The storage tubes may, for example, be of the kind described in an article in the R.C.A. Review, March 1948, pages 112 through 135, entitled "Barrier Grid Storage Tube and Its Operation." Thus, during the time that a particular television scanning line is examined, the irregularly spaced coded H's and T's together with the identifying pulse are supplied by means of the electronic switch $S_1$ to one or the other of storage tubes 21 or 22. Successive television lines are applied alternately to the two storage tubes and stored regularly spaced by a writing process to be described in detail hereinafter. On which storage tube 21 or 22 this writing will appear depends upon the position of electronic switches $S_1$ and $S_3$. As soon as a complete line of information has been stored on one of the storage tubes, the elecetronic switches $S_1$ through $S_4$ are thrown over by a signal obtained from synchronization signal separator 35 and the signals are read out of the storage tube at equally spaced intervals to form an output signal 39. In the diagram of Fig. 2, switches $S_1$, $S_2$, $S_3$, and $S_4$ are positioned such that the T's and H's are being written on storage tube 21 and are being read from storage tube 22.

The various line synchronizing (sync) pulses needed for synchronization are obtained from the sync separator 35. According to the practice familiar to the television art, there may be utilized, for example, a sync stripper 34 to which is supplied the composite input signal $I_1$ and which strips the signal of all but the composite synchronizing information. The resulting composite sync signal is then supplied to the sync separator 35 which isolates therefrom the synchronizing pulses desired. These synchronizing pulses control not only the heretofore mentioned electronic switches $S_1$, $S_2$, $S_3$ and $S_4$, but also control the writing sweep generator 27 and the line sweep generator 37. Additionally, line synchronizing pulses are added to the output signal to secure synchronization at the receiver, but for simplicity of exposition, this has been shown only schematically. In practice, this can be accomplished by utilization of the techniques common in the television art for the addition of synchronizing pulses.

It will be convenient to describe in more detail the computer 13 of Fig. 2 which is used in the line fitting operation, before returning to a more detailed description of the transmitter and receiver as such. This computer will be described with reference to Fig. 4 in which the three major units of the computer are shown as ring modulator 50, integrator 60 and bridge rectifier 100. Referring again momentarily to Fig. 1, it is evident that in the fitting period up to the time T, the difference $\delta A$ between the area under the curve 101 and the area under a chord C or any arbitrary interval is $$\delta A=\int_0^T f(t)dt-\frac{1}{2}Tf(T) \quad (3)$$

Figure 4:
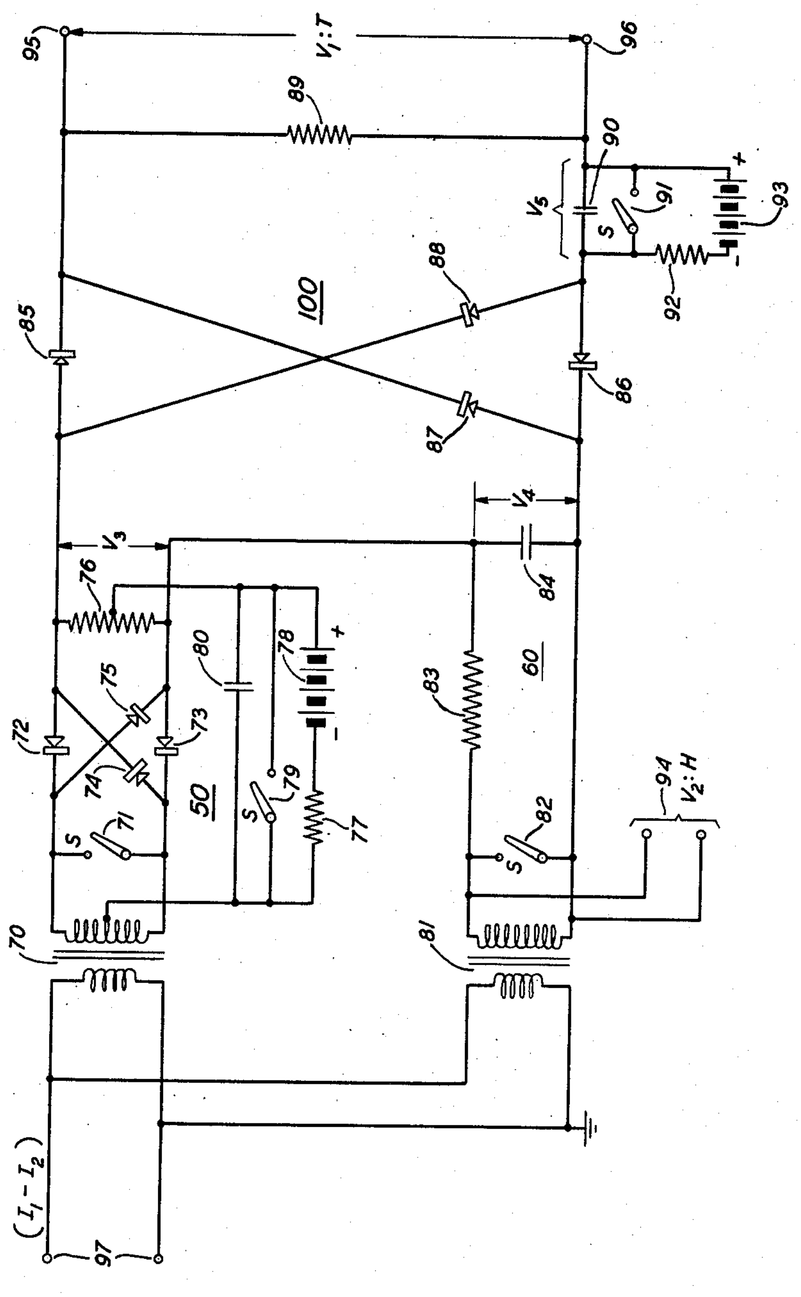
Fig. 4 shows a simple exemplary embodiment of the computer 13 of Fig. 2 which can be employed within the practice of the invention.

The modulator 50 of Fig. 4 provides a voltage which is a measure of $$\frac{Tf(T)}{2}$$

where T is the time elapsing between the start of a fitting interval and its end. This is the area under a triangle of base T, and of height $f(T)$ which is the area under a chord of the message wave extending from $t=0$ to $t=T$.

As described above, the difference signal $I_1-I_2$, obtained from amplifier 10, is applied to the computer input 97, thence to the parallel connected input transformers 70 and 81 feeding, respectively, the ring modulator 50 and the integrator 60.

Ring modulator 50 may be of the type described by F. A. Cowan in United States Patent 2,025,158, for example. In order to make a comparison between the signal as it changes subsequent to its initial value and the straight-line approximation starting from the amplitude $I_2$ with which the line fitter compares it, the modulator is reset to a predetermined value (preferably $=0$) momentarily at the beginning of each fitting period ($t=0$) so that $f(0)=0$. This is accomplished by applying the input signal from a source of low impedance, for example, from the low impedance output of isolating amplifier 10. An electronic switch 71 is closed momentarily between the end of one fitting period and the beginning of another ($t=0$), and the terminal voltage of the secondary of the transformer 70 is thus brought to zero. Further, an electronic switch 79 is closed at the same time to bring the voltage across capacitor 80 to zero. This makes the voltage across the transformer zero at $t=0$, so that the secondary voltage thereafter is $Nf(t)$, where N represents the turns ratio of the transformer, and it also makes the voltage across the capacitor 80 equal to zero at $t=0$. Thereafter, if the resistance R of the resistor 77 and the capacitance C of capacitor 80 are sufficiently large, the voltage appearing across capacitor 80 increases linearly with time from the opening of switch 79 so as to be substantially proportional to $t$ during the fitting period. These voltages $t$ and $f(T)$ act as inputs to a balanced modulator, employing unilaterally conducting devices 72, 73, 74, and 75. These devices may comprise crystal rectifiers.

The voltage across capacitor 80 inversely varies the impedance of each of the elements 72 and 73, and so is a measure of $$\frac{1}{T}$$

Their impedance in turn controls the impedance in the path to the output terminals of the signals applied across transformer 70. Accordingly, the signal $f(T)$ applied at input 97 at the time$=t$ will be affected inversely in transmission through elements 72 and 73 in accordance with their impedance and therefore the output $V_3$ developed across impedance 76 will be $$V_3=KTf(t) \quad (4)$$

where K is a constant determined by the turns ratio N of the transformer 70, the properties of four unilaterally conducting devices 72, 73, 74, and 75 which are employed in the circuit, the resistance R of resistor 77, the capacitance C of capacitor 80 and the voltage E of a battery 78. This output is produced during the period of fitting until switch 79 and a second switch 71 are again closed. This effectively shunts out the unilaterally conducting devices.

Also shown in Fig. 4 is an integrator circuit 60 which is another component of the computer utilized in the invention. This integrator circuit, with the signal $I_1-I_2$ from terminal 97 as an input, produces across capacitor 84 an output $$V_4=\frac{N}{R_1C_1}\int_0^T f(t)dt \quad (5)$$

during the period of fitting. The electronic switch 82 is closed momentarily between the close of one period of fitting and the beginning of the next. This makes the voltage across the secondary of the transformer 81 equal to zero at the beginning of the period of fitting, so that thereafter, until switch 82 is closed again, the secondary voltage is $N_1f(t)$, where $N_1$ is the turns ratio of the transformer 81. The remainder of the circuit comprises a resistor 83 having resistance $R_1$ and a capacitor 84 having a capacitance $C_1$. Thus, in accordance with the invention, $R_1$ and $C_1$ are made large enough so that the output voltage $V_4$ across the capacitor 84 is equal to $$V_4=\frac{N_1}{R_1C_1}\int_0^T f(t)dt \quad (6)$$

as mentioned above.

Further, in accordance with the invention, the modulator 50 and the integrator 60 are adjusted such that $$K=\frac{1}{2}\frac{N_1}{R_1C_1} \quad (7)$$

Thus, at $t=T$, $$V_4-V_3=2K\left[\int_0^T f(t)dt-\frac{1}{2}Tf(T)\right] \quad (8)$$

The expression enclosed by the brackets, as was shown above, is the difference $\delta A$ between the area under the curve and the area under the chord.

The voltage $V_4-V_3$, is applied across a full wave rectifier network 100 of unilateral conducting devices 85, 86, 87, and 88, which can be high back-voltage crystal rectifiers, for instance, such as are now well known in the electrical communication art. The result of this operation is to produce a voltage equal to the absolute value of the difference between $V_3$ and $V_4$ (i.e., $|V_4-V_3|$) proportional to the value of the difference in area between the two curves. This voltage is then applied in series with a voltage $V_5$ developed across capacitor 90 where $$V_5=-(2Kt)E \qquad (9)$$

in which K is the same constant defined above and E is a constant determined by the closeness of the fit desired. This voltage $V_5$ is produced by the charging of capacitor 90 through resistor 92 with the current supplied by a battery 93 after electronic switch 91 is closed momentarily at the beginning of a fitting period. At a time T such that $|V_4-V_3|>V_5$; that is to say $$\int_0^T f(t)dt-\frac{1}{2}Tf(T)>ET \qquad (10)$$

a positive voltage $V_1$ appears across the resistor 89. As discussed above, $V_1$ is one of the two output signals produced by the computer and is supplied to multivibrator 17.

The closeness of the fit is, in accordance with the invention, controlled by adjusting $V_5$. For a close fit, i.e., many line segments being used per unit time, $V_5$ is made small. With $V_5$ adjusted to a larger value, the fit is not so close and fewer line segments are used per unit time. The number of line segments used can readily be counted by activating a binary counter every time a positive voltage $V_1$ appears.

The other computer output signal $V_2$ may be taken, for example, from the secondary of transformer 81. This signal is proportional to the difference signal $I_1-I_2$ and it is to be understood that the voltage may be derived in a number of ways known by those skilled in the art.

The voltage $V_1$ developed across resistor 89, in addition to activating multivibrator 17, is also used to activate the electronic switches 71, 79, 82, and 91 of Fig. 4. Whenever a voltage $V_1$ is developed across resistor 89 in the manner described above, the electronic switches are closed momentarily to terminate the current fitting period and to start a new fitting. Although electronic switches are in common use in the electronic art, an example of a switch which can be used in the practice of the invention is shown in Fig. 5.

Figure 5:
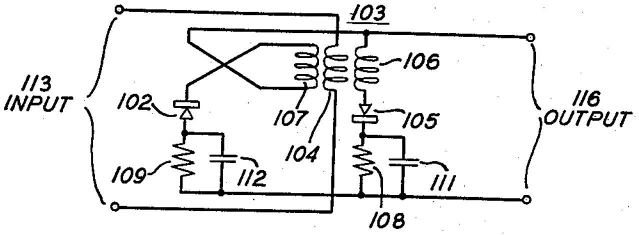
Fig. 5 illustrates a simple electronic switch which can be used in accordance with the invention.

The circuit of Fig. 5 comprises two unilaterally conducting devices 105 and 102 which may be high back-voltage germanium diodes, for example, and a pulse transformer 103 with one primary 104, two like secondaries 106 and 107, and like biasing resistors 108 and 109 and like capacitors 111 and 112. The operation of this circuit is such that the output terminals 116 are shorted, i.e., the switch is "closed," when a pulse is applied to the input terminals 113. As was stated above, a pulse is applied to these terminals 113 whenever a positive voltage $V_1$ appears across the output resistor 89 of the circuit of Fig. 4.

Returning now to a discussion of the transmitter of Fig. 2, it has previously been pointed out that in order to effect a saving in bandwidth, it is necessary to arrange for the storing or writing beam of the storage tubes 21 and 22 to be deflected by each successive line fitting signal and only so far as necessary to write that line fitting signal on the storage surface. The writing sweep generator 27 which controls the deflection of the storing beam of each storage tube is a device which, when actuated by an enabling pulse from multivibrator 17, produces a sweep voltage uniformly increasing or decreasing with time for a period $T_W$ just long enough to write the identifying pulse, the H coded pulse group, and the T coded pulse group on the storage tube, and then holds this voltage steady until a new enabling pulse comes along for restarting the sweep for storing the elements of the next line fitting signal. Moreover, at the start of each new horizontal line of the television picture, the horizontal synchronizing pulse resets the voltage to a standard value $V_0$ corresponding to the starting point of the storing beam. It can be seen that effectively all that is desired is a pulse counter circuit. Pulse counter circuits of various forms are known in the art. A common form of pulse counter comprises a storage capacitor, across which is connected the load, in series with a leakage resistance and a first electronic switch which, although normally open, is closed by the pulses to be counted. In shunt across the storage capacitor there is also serially connected a source of voltage and a second electronic switch which, although normally open, is closed at the start of each counting cycle. In operation, the second electronic switch is closed momentarily so that the capacitor is charged to the source potential. Thereafter, as each of the pulses to be counted momentarily closes the first electronic switch, for the time during which this switch is closed, the charge on the capacitor leaks off through the leakage resistance so that at any particular time the charge on the capacitor and hence the voltage thereacross applied to the load is a measure of the number of pulses applied to the first electronic switch since the time the second electronic switch was last closed. An example of another form of pulse counter which can be adapted for use in the practice of the invention is described in an article entitled "A Precision Television Synchronizing Signal Generator," appearing on page 57 of the RCA Review of July 1940.

Figure 6:
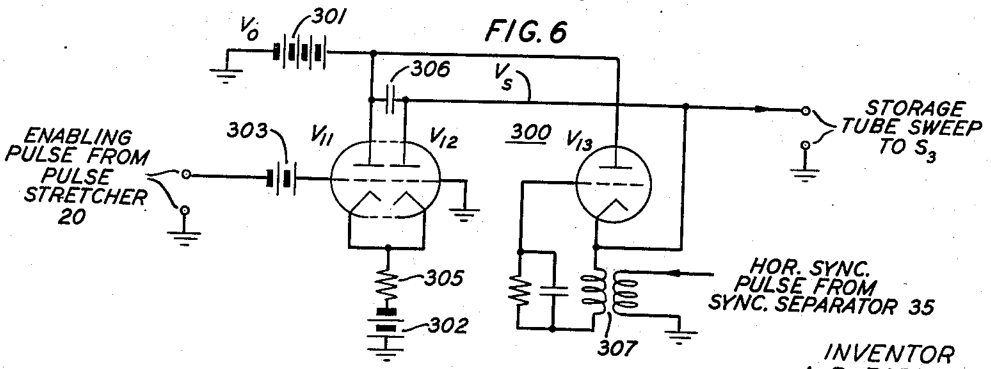
Fig. 6 shows in schematic circuit form a writing generator suitable for use in the transmitter of Fig. 2.

By way of example, in Fig. 6 there is shown schematically a circuit 300 suitable for use as the writing sweep generator 27 of Fig. 2. In this arrangement, the anode-cathode circuit of tube V11 includes, in series, the voltage source 301, which fixes a reference or quiescent value of voltage $V_0$, the voltage source 302 and the resistor 305. The anode-cathode circuit of tube V12 comprises the capacitor 306, in shunt with the cathode-anode circuit of the tube V13, the voltage sources 301, 302, and the resistor 305. The control grid of tube V11 is supplied with enabling pulses, which have passed through pulse stretcher 20 of Fig. 2, by way of the voltage source 303, while the control grid of tube V12 is tied to ground. As a result, the grid of tube V11 is biased positive with respect to that of tube V12 by the voltage source 303, and, in the absence of enabling pulses the current through resistor 305 flows through the tube V11. When an enabling pulse is applied to the control grid of tube V11, i.e., for its duration, the positive bias of voltage source 303 is overcome and the current through resistor 305 is diverted to tube V12 and discharges the capacitor 306 at a uniform rate. Accordingly, there is available at the anode of tube V12 a sweep voltage $V_S$ which decreases uniformly for a time sufficient to store the elements of one line fitting signal and then remains steady until another enabling pulse arrives. Each subsequent enabling pulse additionally discharges capacitor 306 to produce a new decreasing portion of sweep voltage $V_S$. In this way a uniformly decreasing sweep voltage is produced with steady state periods occurring in the absence of enabling pulses. In order to make certain that each decreasing portion of the sweep voltage $V_S$ is of sufficient duration to permit storage of one line fitting signal, each portion of the sweep voltage must be longer than the length of an enabling pulse. To this end, pulse stretcher 20 of Fig. 2, which may be of any type well known in the art, is inserted between multivibrator 17 of Fig. 2 and the input of writing sweep generator 27.

As soon as a complete line of information has been stored, the voltage $V_S$ on the anode of tube V12 is returned to the standard or quiescent value $V_0$ as determined by the potential of the source 301. This is accomplished by applying negative going horizontal synchronizing pulses from sync separator 35 to the cathode control grid circuit of V13 by way of transformer 307. As a result, V13, which is connected in shunt with capacitor 306, conducts and recharges capacitor 306 to its quiescent value $V_0$. Subsequent pulses from pulse stretcher 20 then recharge capacitor 306 in discrete steps to produce a new sweep voltage $V_S$ for the next line of information.

With reference again to Fig. 2, as soon as a complete line of information has been stored on storage tube 21, a signal 36 from sync separator 35 activates line sweep generator 37 which controls the cathode ray reading beam of the storage tube and enables the output to be read therefrom. Any of the line sweep generator circuits well known in the art may be utilized for this purpose. After electronic switches $S_1$ through $S_4$ have been activated, the signals on storage tube 21 are read out at equally spaced intervals to form the output signal 39, while the currently produced H's and T's go meanwhile to storage tube 22 as discussed above.

Figure 3:
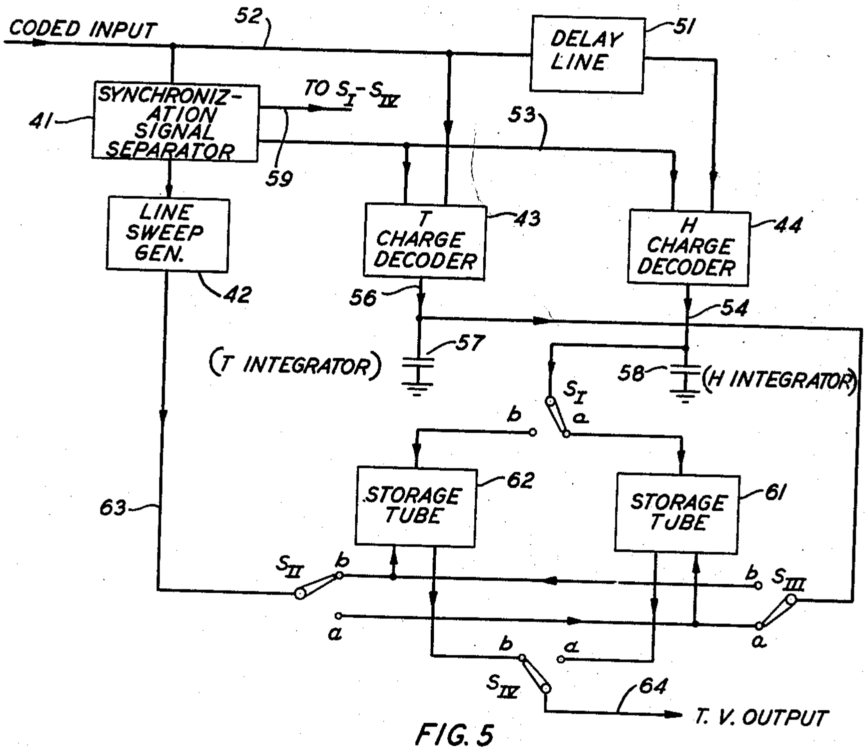
Fig. 3 is a schematic block diagram of a television receiver which can be used in conjunction with the transmitter of Fig. 2.

In Fig. 3, there is shown a receiver which operates in conjunction with the transmitter illustrated in Fig. 2. The coded input signal is fed by lead 52 to the T charge decoder 43, and, by way of delay line 51, to the H charge decoder 44. Here the regularly spaced code groups are decoded to produce voltages representative of the individual T's and H's of the chords of the original signal and applied to one of the storage tubes 61 or 62. At the end of each line, a synchronizing pulse activates the necessary switches and the information stored on the storage tube is read out to produce an output signal which comprises a connecting series of straight lines representative of the original signal.

Now considering the receiver of Fig. 3 in more detail, synchronizing signal separator 41 is supplied with the coded input signal and derives therefrom all necessary synchronizing signals. It has, as one output, the line synchronizing pulses which were added at the transmitter to the coded output, and also includes a circuit responsive to the identifying pulses which precedes each coded pulse group. This separation can be effected by the techniques common in the television art for the separation of synchronizing signals. The line synchronizing pulses operate the line sweep generator 42 which controls the reading beam of storage tubes 61 and 62, and four switches $S_I$, $S_{II}$, $S_{III}$, and $S_{IV}$ which have a function similar to that of switches $S_1$, $S_2$, $S_3$, and $S_4$ of Fig. 2. Additionally, the identifying pulse output of the sync separator 41 is utilized to unlock the T and H charge decoders 43 and 44 for the time interval during which each is being supplied with its appropriate code group. These decoders are similar to those utilized in the transmitter of Fig. 2 with the addition of a simple gating arrangement to insure proper distribution of the T and H charges to their associated decoders. This distribution is accomplished, for example, by inserting a delay line 51 in the circuit between the input and the H charge decoder so that the coded T and H groups are fed to decoders 43 and 44 at the proper times.

These decoders produce currents $Tf(t)$ and $Hf(t)$, i.e., the amplitudes represented by T and H times a common time function. That is to say, the decoders deliver a total charge which is proportional to the amplitude represented by the decoded signal. The charge does not flow instantaneously and the current this transfer of charge constitutes need not have any particular waveform, so long as the waveform is always the same for each decoder. This rather arbitrary waveform of current is called simply a common time function since it is common between the decoders, and is represented as $f(t)$.

The signal 56, representing $Tf(t)$, and the signal 54, representing $Hf(t)$, are put on capacitors 57 and 58, respectively, to maintain the charge from the decoder during the intervals between pulse groups. Capacitors 58 and 57 may be referred to as the H integrator and T integrator, respectively. Obviously, the changes in charge on the condensers will be, respectively, $$Q_1=Tf(t)dt \tag{11}$$

and $$Q_2=Hf(t)dt \tag{12}$$

At any time during the charging, $Q_1$ will be proportional to $Q_2$. Preferably capacitors 57 and 58 should be discharged at the end of each line. This may be accomplished, for example, by means of an electronic switch of the type described above activated by line sync pulses.

The voltage of the capacitor 57, the T integrator, passes through $S_{III}$ to storage tube 61 to provide deflection, while the voltage of capacitor 58, the H integrator, passes through $S_I$ to the back plate or to the input control of storage tube 61. Thus, the voltage pattern stored on storage tube 61 is a representation of the original television signal 101 made up of a series of straight lines.

When a complete scanning line has been reconstructed from its T's and H's, a signal from the synchronization separator 41 supplied by way of lead 59 operates the electronic switches $S_I$, $S_{II}$, $S_{III}$, and $S_{IV}$, so that storage tube 61 is connected to the output lead 64. A linear sweep signal, generated by sweep generator 42 (which is actuated by a line sync pulse from sync separator 41), is applied by way of lead 63 to the storage tube 61 to read out the stored information at the line sweep rate. The scanned output forms the reconstructed television signal supplied to the output lead 64. Meanwhile, a similar set of operations takes place on storage tube 62 so as to write a new line signal into that tube.

The invention has been described in terms of fitting a chord by comparing the area under the signal with the area under the chord. That is, the fit is based on the difference in the interval $t=0$ to $t=T$ between the area under $f(t)$ and the area under a chord. In accordance with the invention, the total difference in area is compared with ET, where E is a constant which can be assigned as discussed above. This, of course, is not the only possible approach in fitting signals with straight lines. One possibility, for example, is to use constant amplitude or horizontal lines and to start a new line every time the ordinate changes by more than a certain amount. Alternately, a new line can be started whenever the mean square error exceeds a certain quantity. There are also other ways to fit slanting lines to the signal function. One example is to take the tangent at $t=0$ and to allow only a certain error in ordinate between an extension of the tangent and $f(t)$. Another possibility is to obtain the integrated mean square error between $f(t)$ and a chord between $t=0$ and $t=T$. Although all of these methods of approximating the signal with a series of straight lines are within the general scope of the invention, it can readily be demonstrated that the technique which has been described in detail, i.e., taking the differences between areas, offers a more accurate and in general more satisfactory method of straight line signal approximation than any other. This technique, therefore, constitutes the preferred embodiment of the invention.

It is to be understood that the above-described arrangements are illustrative of the application of the principles of the invention. Numerous other arrangements may be devised by those skilled in the art without departing from the spirit and scope of the invention.

What is claimed is:

1. In combination with a source of a message wave characterized by portions of rapid fluctuation and by other portions of extended length throughout which fluctuation is substantially absent, apparatus which comprises means for deriving an error function proportional to the difference in area between the envelope of said message wave and each one of an asymmetrical sequence of different straight-line approximations to said message wave envelope, including means for subtracting from the area defined by said message wave envelope the areas defined by said straight-line approximations to said message wave envelope, means for generating an amplitude sample of said message wave at each instant at which said error function exceeds a pre-established error function magnitude, whereby a sequence of said amplitude samples is generated that is characterized by the same temporal irregularity as is the original message wave, means for transmitting the amplitude samples and instants of occurrence of each amplitude sample of said sequence to a receiver station, and at said receiver station, means for reconstituting said message wave from said received sample sequence.

2. In combination, a source of a message wave, apparatus which comprises means for continuously determining the extent of the area differential between portions of the envelope of said message wave and straight-line approximations thereto, means for deriving an instantaneous sample of said message wave each time said differential area exceeds a selected value, means for generating for each message sample a first sequence of pulses representative of the amplitudes of said samples and a second sequence of pulses representative of their instants of occurrence, said first and said second sequence of pulses being generally temporarily irregular, means for transforming said temporally irregular sequences of pulses into temporally regular sequences of pulses, means for transmitting said regular sequence of pulses to a receiver station, and, at said receiver station, means for utilizing the transmitted sequences of pulses for producing a replica of said message wave.

3. In combination with a source of a message wave characterized by portions of rapid fluctuation and by other portions of extended length throughout which fluctuation is substantially absent, apparatus which comprises means for continuously generating a function proportional to the difference in area between the envelope of said message wave and each one of an aperiodic sequence of straight-line approximations to said signal envelope, means for deriving a sample of the amplitude of said wave at each instant at which said function exceeds a pre-established threshold, whereby a sequence of amplitude samples is generated that is characterized by the same temporal irregularity as is the original message wave, means for generating a timing signal to identify said sampling instants, means for transforming said temporally irregular amplitude samples and said timing signals into a temporally regular sequence of signals, means for transmitting said regular sequence of signals to a receiver station, and, at said receiver station, means for reconstituting said message wave from said received signal sequence.

4. In a transmission system, a computing circuit supplied with a message wave comprising means for deriving an auxiliary wave representative of the envelope of said message wave, said auxiliary wave comprising a succession of linear wave segments, means for integrating the message wave, means for integrating said auxiliary wave, means for comparing said integration of said message wave with an integration of said auxiliary wave, means responsive to the difference in the two integrations for forming a succession of aperiodic series of pulses, means supplied with said succession of aperiodic series of pulses and actuated at the start of each series of pulses and energized for the duration of each series of pulses for storing said succession, and means actuated periodically for deriving for transmission to a receiving point the stored succession at a uniform rate whereby there is formed a succession of periodic pulses.

5. In combination with a source of a message wave, apparatus which comprises means at a transmitter station for sampling the ampiltude of said message wave at selected instants, means for selecting the sampling instants to maintain the absolute value of the difference between the area enclosed by the envelope of said message wave between successive samples and the area enclosed by a linear approximation to said message wave between said successive samples below a pre-established minimum value, said selecting means including means for subtracting from the area defined by said message wave envelope the area defined by said straight-line approximations thereto, amplitude sample identifying means including means for initiating the generation of periodic counting pulses at each of said selected sampling instants and means for counting the total number of counting pulses generated between successive selected sampling instants, means for transforming said amplitude samples of said counting pulses into a single regular sequence of pulses, a transmission medium extending from said transmitter station to a receiver station, means for transmitting said regular sequence of pulses to said receiver station, and, at said receiver station, means for reconstituting said message wave from said transmitted pulses.

6. The apparatus as defined in claim 5, wherein said means at said receiver station for reconstituting said message wave includes means for transforming said regular sequence of received pulses into an irregular sequence of samples characterized by the spacing irregularity of said selected sampling instants, and means for generating an artificial message wave from said irregular sample sequence.

7. A transmission system comprising, in combination, means supplied with a time variant message wave for deriving from said message wave a signal representative of the envelope of said message wave, said signal being composed of a succession of irregularly spaced pulses representative of the successive changes in the amplitude of said message wave within a preassigned time interval, means for integrating said message wave, means for integrating said signal representative of the envelope of said message wave, means for comparing the integration of said message wave with the integration of said signal representative of the envelope of said message wave, means responsive to the difference between said integrations for producing a succession of irregularly spaced pulses to represent the duration of said preassigned time interval each time the difference between said integrations exceeds a predetermined amount, means for transforming said succession of irregularly spaced pulses representative of the successive changes in the amplitude of said message wave and said succession of irregularly spaced pulses representative of the durations of said time intervals, respectively, into periodic successions of pulses for transmission, means for transmitting to a receiver station said periodic successions of pulses, and at said receiver station means for utilizing the transmitted successions of pulses for producing a replica of said message wave.

8. The transmission system defined in claim 7 wherein said periodic succession of pulses representative of the amplitude changes of said message wave and said periodic succession of pulses representative of time intervals corresponding respectively to said amplitude changes are transmitted to said receiver station in time alternation.

9. In combination with a source of a message wave, apparatus which comprises, means at a transmitter station for deriving from said message wave a temporally irregular sequence of brief instantaneous samples of the amplitude of said wave in accordance with a preassigned program, means for deriving a first pulse train representative of the amplitudes of said samples and a second pulse train representative of their instants of occurrence in which the information rates in said two independent pulse trains vary from time to time in accordance with the momentary statistics of said wave, means for transmitting said independent pulse trains to a receiver station at a transmission rate equal to the average of said sample rate taken over a period that is long compared with any interval of high information density in said signal and, at said receiver station, means for restoring said pulse trains to their original time scales, means under control of the two consecutive members of each pulse pair of the second train for reconstituting a smooth wave in accordance with said program, and means under control of said second train for modifying the amplitudes of said reconstituted wave in accordance with said original wave.

References Cited in the file of this patent

UNITED STATES PATENTS

| | | |
|---|---|---|
| 2,202,605 | Schroter | May 28, 1940 |
| 2,510,054 | Alexander et al. | June 6, 1950 |
| 2,521,733 | Lesti | Sept. 12, 1950 |
| 2,567,691 | Bock et al. | Sept. 11, 1951 |
| 2,605,361 | Cutler | July 29, 1952 |
| 2,662,118 | Schouten et al. | Dec. 8, 1953 |
| 2,664,462 | Bedford | Dec. 29, 1953 |
| 2,676,202 | Filipowski | Apr. 20, 1954 |
| 2,697,201 | Harder | Dec. 14, 1954 |
| 2,801,281 | Oliver et al. | July 30, 1957 |

FOREIGN PATENTS

| | | |
|---|---|---|
| 249,516 | Switzerland | May 1, 1948 |